Sept. 19, 1961 G. DIRKS 3,001,017

METHOD AND MEANS FOR THE AUTOMATIC REPETITION OF SIGNAL TRANSMISSIONS

Filed Aug. 6, 1956

7 Sheets-Sheet 1

Inventor
Gerhard Dirks

By Shoemaker & Mattare

ATTYS

Inventor
Gerhard Dirks

By Shoemaker & Mattare
ATTYS

Inventor
Gerhard Dirks
By Shoemaker & Mattare
ATTYS

Sept. 19, 1961 G. DIRKS 3,001,017

METHOD AND MEANS FOR THE AUTOMATIC REPETITION OF SIGNAL TRANSMISSIONS

Filed Aug. 6, 1956 7 Sheets-Sheet 4

Inventor
Gerhard Dirks

By Shoemaker & Mattare

ATTYS

Inventor
Gerhard Dirks

By Shoemaker & Mattare
ATTYS

Inventor
Gerhard Dirks
By Shoemaker & Mattare
ATTYS

Inventor
Gerhard Dirks

By Shoemaker & Mattare
ATTYS

United States Patent Office 3,001,017

Patented Sept. 19, 1961

3,001,017

METHOD AND MEANS FOR THE AUTOMATIC REPETITION OF SIGNAL TRANSMISSIONS

Gerhard Dirks, 44 Marfelder Landstrasse, Frankfurt am Main, Germany

Filed Aug. 6, 1956, Ser. No. 602,395
Claims priority, application Great Britain Aug. 5, 1955
6 Claims. (Cl. 178—23)

The present invention relates to signal transmission systems. This invention relates more particularly to continuously operative signal transmission systems between two stations such as punch tape receiving and transmitting stations.

It is known to operate decentralized transmission systems so that if an error is detected by error detecting means the transmission to the receiver is interrupted until an operator arrives to reactivate the transmitting end of the system and locate and correct the error to the receiving end of the system. This is particularly disadvantageous especially during transmission at night.

In accordance with the present invention, storage means is added either in the receiver or in the transmitter or in both to repeat the transmission if an error is detected by error detecting means and until only correct data has been transmitted so that correct data is then recorded at the receiver end of the transmission system and whereby if an error occurs in transmission the decentralized transmission system remains continuously operative.

The present invention therefore provides a continuously operating signal transmission system including error detecting means operating at intervals and provided with storage means for the signals being transmitted between error-detecting operations, such storage means being operative under the control of the error detecting means.

Another feature of the present invention is the provision of a continuously operating signal transmission system including an error detecting means, in which the transmitted signals are also recorded in storage means so that in the event of an error being detected a second transmission may be effected from such storage means.

The continuously operative signal transmission system of the present invention includes error detecting means operating at intervals and provided with a storage in the receiver for the signals being transmitted between error detecting operations, such storage means being operative under the control of the error detecting means for preventing the recording in the receiver of erroneously transmitted signals.

The continuously operative signal transmission system of the present invention further includes error detecting means operating at intervals and is provided with storage means in the transmitter for the signals being transmitted between error detecting operations, such storage means permitting the repetition of the transmission if an error was detected in the first transmission by the error detecting means. Furthermore the continuously operative signal transmission system of the invention may include error detecting means, operating means, and may be provided with storage means in the receiver and in the transmitter for the signals being transmitted between error detecting operations, such receiver storage means being operative under the control of the error detecting means for preventing the recording in the receiver of erroneously transmitted signals and such transmitter storage means permitting the repetition of the transmission if an error was detected in the first transmission by the error detecting means.

In accordance with the present invention, a preferred embodiment of a signal transmission system, including a transmitter station and a receiver station, comprises record carrier means having recorded thereon consecutive groups of record signals. Transmitter sensing means for sensing the record signals is positioned in the transmitter station in operative proximity to the record carrier means. Transmitter storage means is connected to the transmitter sensing means for storing record signals sensed by the transmitter sensing means. Transmitting means connected to the transmitter sensing means transmits the record signals sensed by the transmitter sensing means from the transmitter station to the receiver station. Receiver storage means in the receiver station receives and stores transmitted signals. Receiver sensing means for sensing received signals stored in the receiver storage means is positioned in the receiver station in operative proximity to the receiver storage means. Comparing means compares received signals stored in the receiver storage means with the record signals to check the received signals for identity and non-identity with the record signals and control means is responsive to an identity for forwarding the received signals stored in the receiver storage means and is responsive to a non-identity for sending a repeat signal to the transmitter station to cause the repeat sensing of the record signals stored in the transmitter storage means.

In order that the present invention may be readily carried into effect, it will now be described with reference to the accompanying drawings, wherein.

In the specification and drawings components such as relays, windings and associated parts are identified by a basic number such as, for example, 15. A number power is added to the basic number to refer to a winding, such as, for example, $15^1$, $15^2$, and an alphabetical letter is added to the basic number to refer to an associated switch or contact, such as, for example, 15A, 15B.

Figure 1:
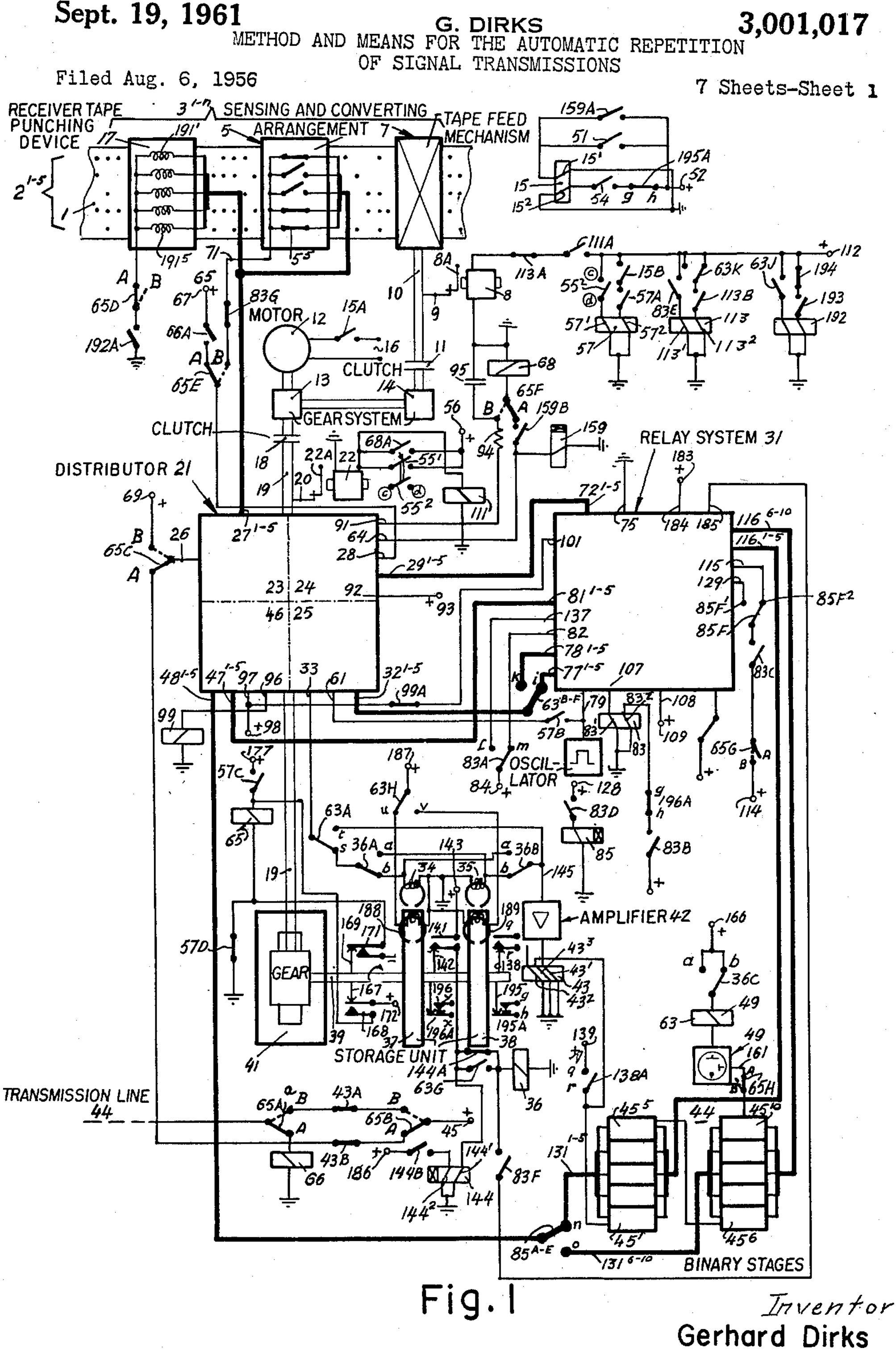
FIG. 1 is a schematic circuit diagram of an embodiment of the signal transmission system of the present invention including a transmitting station and a receiving station with switching positions for transmission shown in broken lines and the switching positions for reception shown in full lines.

The embodiment in FIG. 1 indicates in broken lines and with referenec character B the position of the switching means for transmission of signals. The full lines and reference character A are used to indicate the position of the switching means for the reception of signals.

In FIG. 1 a conventional perforated tape 1 has five code channels $2^{1-5}$ each of which is perforated. The perforations are in transverse rows $3^{1-n}$ in accordance with predetermined combinations representing the data to be transmitted. The sensing and converting means 4 extends above said tape; and comprises a set of sensing switches $5^{1-5}$ corresponding to respective code element channels $2^{1-5}$.

Each of the sensing switches $5^{1-5}$ is operated by a corresponding pin from below the tape which penetrates through the perforations of the tape 1 to close a circuit for the corresponding code channel.

The tape 1 is fed by a conventional tape-feed mechanism 7 which operates stepwisely, one transverse row in each step, under the control of a magnet 8 which energised actuates the armature 8A as described infra. The armature 8A of magnet 8 normally obstructs movement of a latch 9 on a shaft 10, but upon energization of magnet 8 it is disengaged from the latch 9 to permit a single revolution of the shaft 10. A friction clutch 11 is provided between a motor 12 and the shaft 10 to ensure rotation of the shaft 10 as soon as the latch is disengaged. The motor 12 transmits rotation through the friction clutch 11 via a gear system 13, 14. Motor 12 is switched on by a switch 15A connecting it to a source of power 16.

The sensing means 4 including the sensing switches $5^{1-5}$ functions to sense signals on the tape 1 and to produce a record of the sensed signals on storage means described below.

When the system is to be used as a receiver, the sensing means 4 is rendered inoperative as described below, and a conventional punching mechanism 17 for tapes with five code elements becomes operative.

The motor 12 drives via gear 13 and friction clutch 18 a shaft 19 to a distributer 21 the circuitry of which is described with reference to FIG. 2. A control magnet 22 between the friction clutch 18 and the distributer 21 actuates an armature 22A and when energized permits one rotation of the shaft 19, because a latch 20 becomes disengaged from the armature 22A.

The distributer 21 includes distributor sections 23, 24 and 25. The distributor section 23 is provided with an input 26 and outputs $27^{1-5}$. The distributor section 24 is provided with an input 28 and outputs $29^{1-5}$. The outputs $29^{1-5}$ are connected in parallel to the respective relay windings of a relay system 31. The distributer section 25 has inputs $32^{1-5}$ each connected to one of the respective relay contacts of the relay coils within the relay system 31 as clearly shown in FIG. 3. The output 33 of distributor section 25 leads either to a sensing or signal head 34 or a sensing or signal head 35 through a double switch 36A and 36B and $37^3$ operated as described below. Although the signal heads 34 and 35 may be used for recording and sensing, they are always used so that when one records the other simultaneously senses, as described below.

The sensing heads 34 and 35 are arranged opposite the magnetizable surface of a pair of rotatable storage or record elements 37 and 38 for tracing thereon tracks of signals upon a relative movement between said recording heads 34 or 35 and the magnetizable surface of the corresponding storage or record elements 37 and 38. The storage or record elements 37 and 38 are driven by the shaft 19 being driven in a step-by-step manner one complete rotation for each step, as described. The storage or record elements 37 and 38 rotate with a shaft 39 which is driven from the shaft 19 through suitable reduction gearing 41.

Assuming by way of example that a maximum capacity between checking operations is 80 character areas, any one complete rotation of the storage or record elements 37 and 38 corresponds to 80 character areas plus five additional areas. The five additional areas are provided in order to allow for recording of check signals from the computing and checking device described below and for delays in the operation of the system such as during switching from reception to transmission, or vice versa, etc. Although 80 characters may be represented on the storage or record elements 37 and 38 this does not necessarily mean that 80 character areas may be sensed between checking operations on the tape. The step-by-step movement of the tape is thus synchronized with movement of the record elements only during sensing of the tape which sensing may be interrupted by the sensing of a signal combination indicating the end of a group of signals (less than 80) which are to be checked. Despite the interruption of the sensing of the tape 1, the storage or record elements 37 and 38 continue to rotate step-by-step until one complete rotation, or 85 character areas, have passed under the sensing heads 34 and 35.

The sensing heads 34 and 35 are used as recording or reproducing heads, in dependence on the switch position of the triple switch 36A, 36B and 36C. In the switch position *b* of switch 36A, the signal head 34 functions as a recording head, while during the next rotation of the storage or record elements 37 and 38, the switch 36A is moved by energization of a relay coil 36 of the pulse-actuated two position triple switch to switch position *a* in which the signal head 34 functions as a sensing head, and vice versa. Signal head 35 functions as a sensing head in switch position *b* of switch 36B.

Figure 4:
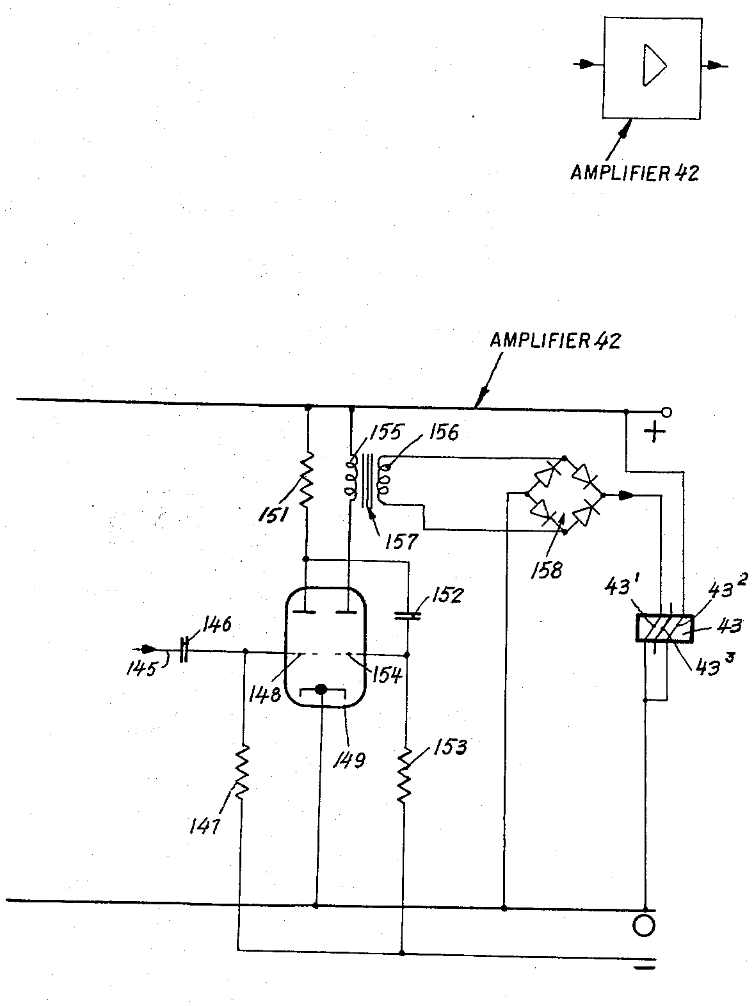
FIG. 4 is a schematic circuit diagram of an embodiment of the amplifier component of the embodiment of FIG. 1.

The delivery of the pulses for energizing switch 36 is described below. In the switch position *a* of the switches 36A, 36B and 36C the signal head 34 functions as a sensing head which is connected to an amplifier 42 (FIG. 4). The amplifier 42 controls a conventional telegraphic relay coil 43 for operating a contact 43A in transmission line 44, connecting plus pole 47 to said transmission line.

Figure 6:
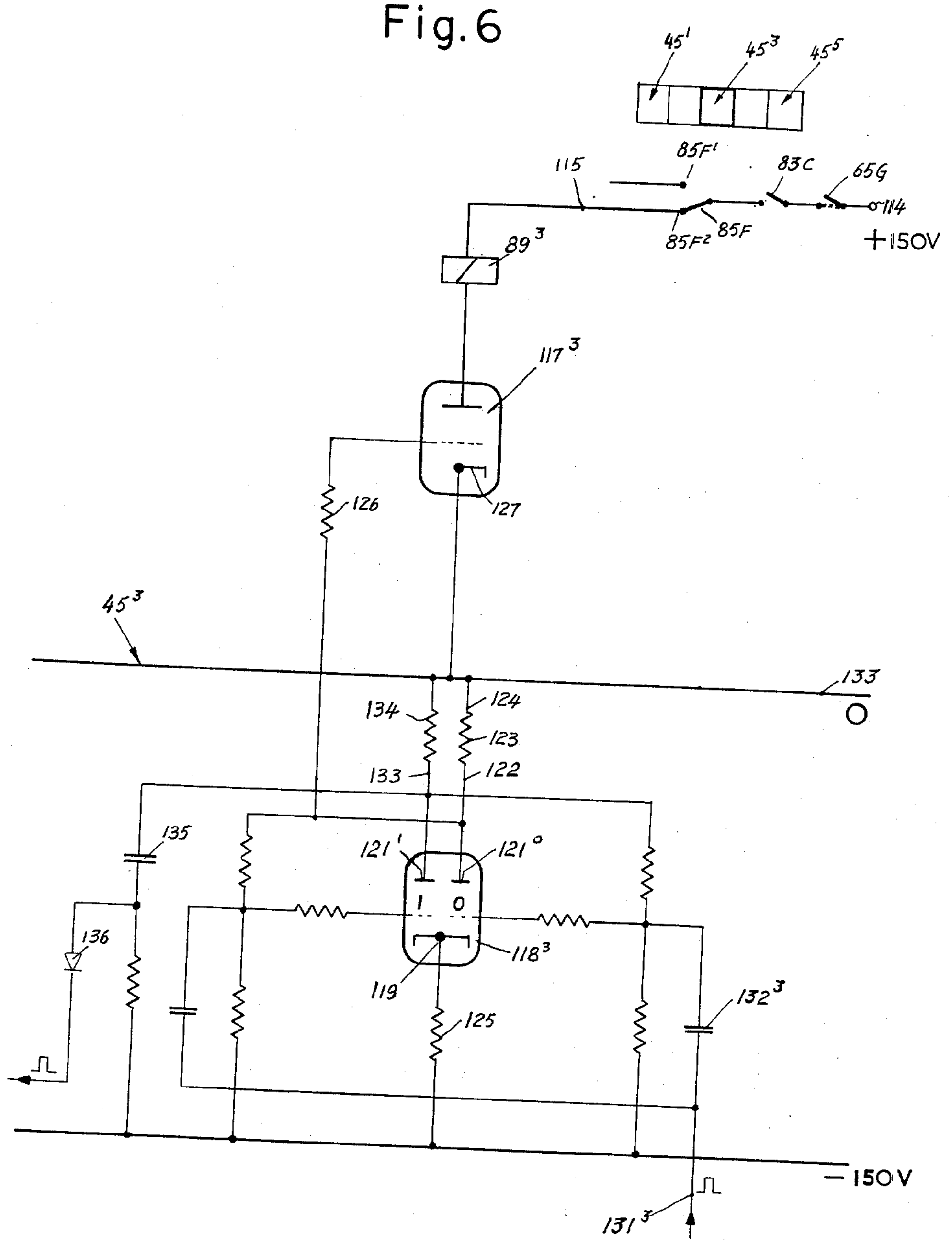
FIG. 6 is a schematic circuit diagram of one stage of an embodiment of the computer component for check signals of the embodiment of FIG. 1.

A computer and checking arrangement 44, one stage of which is shown in more detail, in FIG. 6, includes two sets of five binary accumulator stages $45^{1-5}$ and $45^{6-10}$ respectively. Each of the binary stages in set $45^{1-5}$ has an input corresponding to the respective code channels in the input tape 1, with a carry-over means from stage to stage. The input to the stages $45^{1-5}$ is under the control of the relay system 31 which is set in accordance with the contact positions of the sensing means $5^{1-5}$ in the code channels, and said relay system is operative to control distributer section 46 having the inputs $47^{1-5}$ and outputs $48^{1-5}$, leading to the respective binary stages $45^{1-5}$. Each of the binary stages in set $45^{6-10}$ has only carry-over means from stage to stage, and the set $45^{6-10}$ has a single input for a carry-over from binary stage $45^5$ to binary stage $45^6$.

Figure 7:
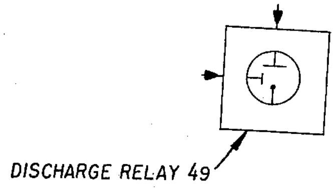
FIG. 7 is a schematic circuit diagram of an embodiment of the control means responsive to identity, of the embodiment of FIG. 1.
Figure 7:
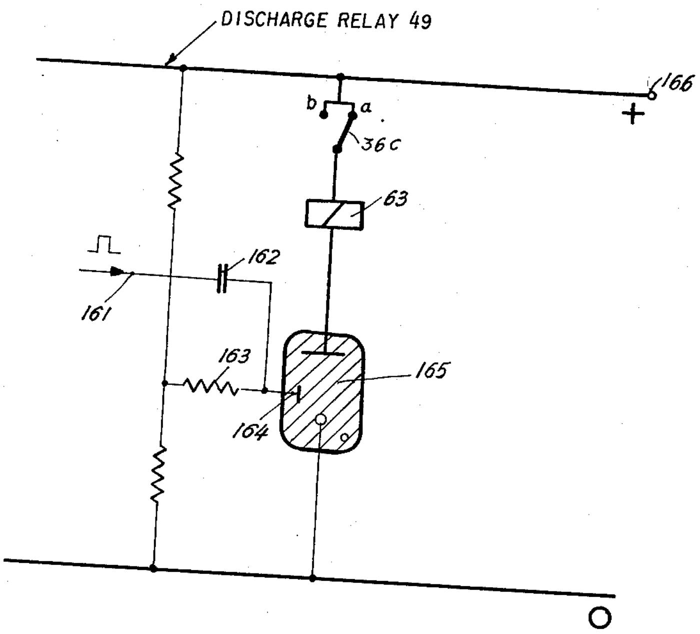

The binary stage $45^{10}$ has a carry-over connection to a discharge relay 49 (FIG. 7).

*Starting the transmitter*

The transmitter is started by closing a switch 51 manually, thereby closing the circuit from a positive polarity terminal 52 to winding $15^1$ of a relay 15 and closing the switch 15A to start the motor 12, and by closing a switch 54 in a hold circuit to a hold winding $15^2$ of the relay 15. The starting magnet 22 is energized by manually closing a double switch $55^1$ and $55^2$, which closes the circuit from a positive polarity terminal 56, through said starting magnet to ground for a period shorter than one rotation of the shaft 19 so that said shaft is blocked, after one rotation, through latch 20 and armature 22A. The switch $55^2$ is repeated in the drawing for clarity at points *c* and *d*. The closing of the switch $55^2$ energizes winding $57^1$ of a relay coil 57 actuating relay contact 57A, thereby closing a hold winding $57^2$ of relay 57. A contact 15B of the relay 15 is closed thereby connecting the circuit to ground.

*The distributor*

Figure 2:
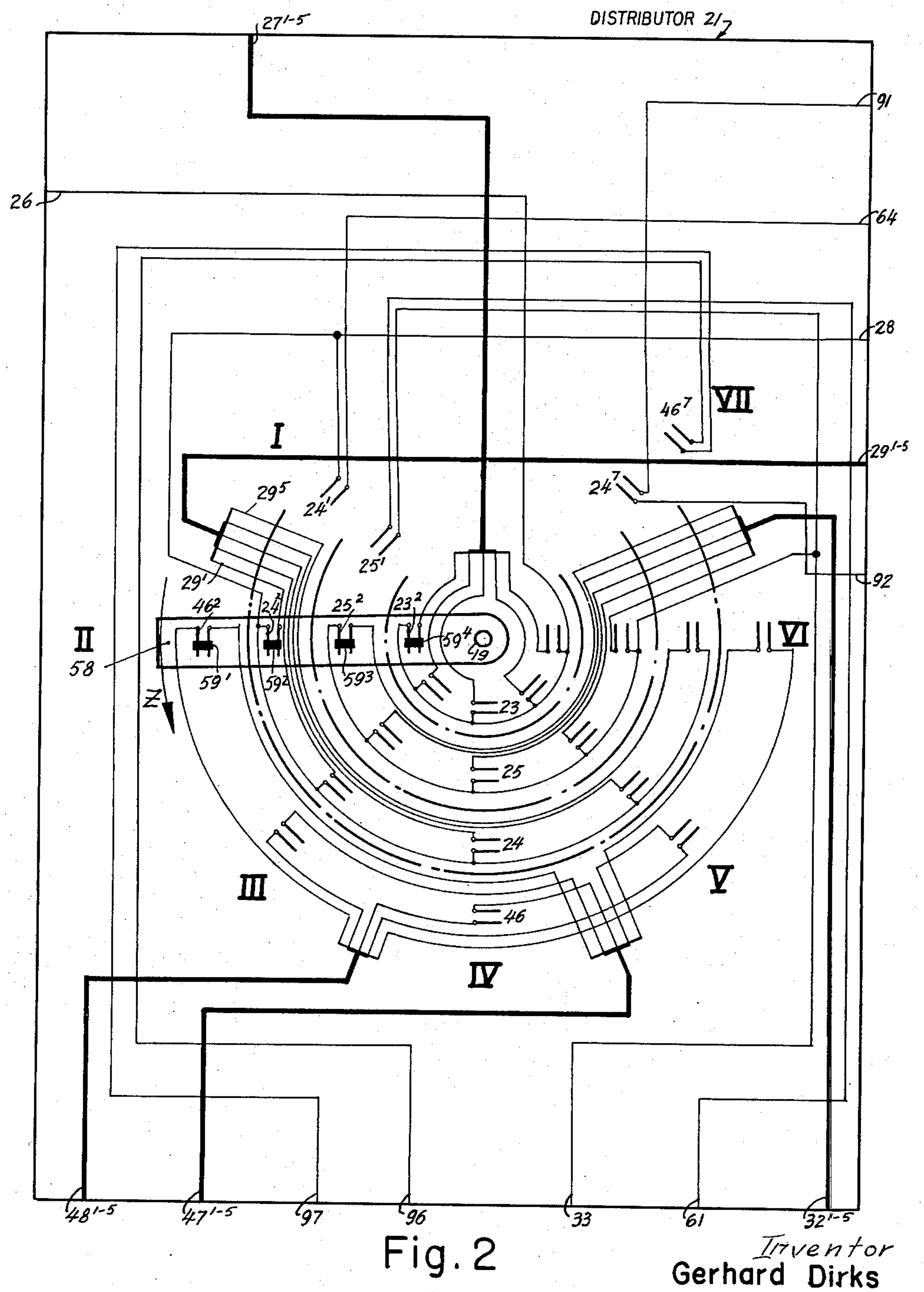
FIG. 2 is a schematic circuit diagram of an embodiment of the distributor component of the embodiment of FIG. 1.

Referring to FIG. 2, the distributor 21 includes a distributor arm 58 rotating with the shaft 19 in the counterclockwise direction as shown by arrow *z*. The distributor arm 58 is provided with four independent contact bridges $59^{1-4}$. Although only four bridges are shown, it is to be understood that more may be used. The contact bridge $59^1$ closes the circuits of the distributor section 46. The contact bridge $59^2$ closes the circuits of the distributor section 24. The contact bridge $59^3$ closes the circuits of the distributor section 25; and the contact bridge $59^4$ closes the circuits of the distributor section 23. In each complete rotation the distributor arm 58 passes through seven switching phases indicated by Roman numerals and in which the contact bridges $59^{1-4}$ close the circuits of the four distributor sections as follows. The start and stop position of the distributor arm 58 corresponds to phase I. The phase I position is determined by the latch 20 (FIG. 1) abutting armature 22A and holding the shaft 19 against the torque to which it is subjected by the motor 12 through the friction clutch 18.

*Phase I*

Figure 5:
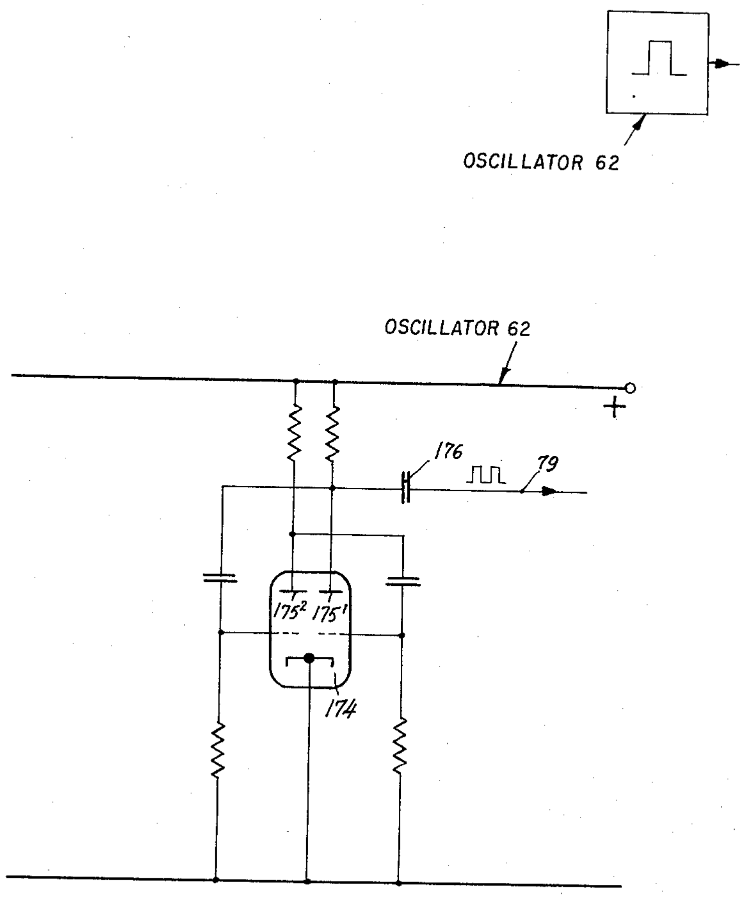
FIG. 5 is a schematic circuit diagram of an embodiment of the oscillator component of the embodiment of FIG. 1.

In phase I the contact bridge $59^3$ closes the circuit through switch $25^1$ between a lead 61 and the lead 33. An oscillator or oscillation generator 62, shown in detail in FIG. 5, delivers frequency signals via a switch 57B, actuated by the relay 57 as described above, to lead 61 and, within rotation phase I, via the closed switch $25^1$ to lead 33 and from there across a switch 63A described below and to the switches 36A and 36B and the winding of the recording head 34 back to ground. As a result the frequency signals from the oscillator 62 produce a record of said frequencies on the magnetic surface of the storage or record element 37, moved during phase I relatively to the sensing head 34 by 1/7 of the first character area as described above, or through an arc of about 36 minutes.

In phase I, the contact bridge $59^2$ also closes the circuit through a switch $24^1$ between a lead 64 and the lead 28. The switch $24^1$ is effective only when the system is used as a receiver to allow the transfer of the starting pulse from the transmitting line 44 to the starting magnet 22, to release the latch 20 on the shaft 19 as explained previously and to allow one complete rotation of said shaft. When the system operates as a receiver, switches 65A, 65B, 65C, 65D, 65E, 65F, 65G and 65H are in the broken line positions and are operated to these positions by relay coil 65. The operation of the relay coil 65 is explained below. As soon as the current in the closed circuit transmission line 44 is interrupted in known manner by the relay 43 and the switch 43A in the transmitter, the receiver, which is an exact duplicate in all respects of the transmitter, receives the pulses from the transmitter through the line 44. The switch 65A is then in the full line position to de-energize telegraphic relay coil 66 which closes its contact 66A of the receiver (upper left hand of FIG. 1) when the contact 43A of the transmitter is opened. The closing of the switch 66A closes a circuit from a positive polarity terminal 67 through the switch 66A, the full line position of switch 65E to the input lead 28 of the distributor section 24 and to the switch $24^1$ and the contact bridge $59^2$ and to the lead 64 through the switch 65F in the full line position in the receiver to relay coil 68 controlling contact 68A, and grounded. The energization of coil 68 effects a closing of its switch 68A thereby closing the circuit from the positive polarity terminals 56 through control magnet 22 to ground.

*Phases II–VI*

In phase II, the contact bridges $59^{1-4}$ close the respective circuits through switches $46^2$, $24^2$, $25^2$ and $23^2$. The index to each of these reference numbers indicates the phase concerned. Switch $23^2$ is in the circuit between the lead 26 and the lead $27^1$. The lead 26 is connected to a positive polarity terminal 69 in the transmitter when switch 65C is in the broken-line position and, during this connection, current is transferred through lead $27^1$ to the respective sensing switch $5^1$ in the first code channel $2^1$. If there is a perforation in the tape 1 at the sensing position, the respective sensing pin closes the sensing switch $5^1$ to a lead 71 and through switch 65E, which is now in its broken line position (transmitter) to a lead 28, connecting it to contact $24^2$ closed by the contact switch $59^2$, to lead $29^1$ and thence to relay lead $72^1$ (FIG. 3) through one winding $73^1$ of a relay 73 to a lead 74 and out at a lead 75 to ground thereby to energize the relay 73 through respective contacts or switches 73A, 73B, 73C, 73D and 73E as explained below. Switch $25^2$ is in the circuit between the leads $32^1$ and 33. Lead $32^1$ is connected to switch 63B of five double position switch 63B, 63C, 63D, 63E and 63F in either position *i* or *k* operative under control of the relay 63 as described below. In the position *i* the connection is to a lead $77^1$ and in the position *k* the connection is to a lead $78^1$.

The lead $77^1$ goes to contact 73C of relay 73 which is closed on energization of the relay 73 as described above, and connects with a lead 79 to the oscillation generator 62. The oscillator 62 delivers frequency signals to a switch $25^2$ through the contact bridge $59^3$ and thence to the lead 33, which, through the switch 63A operates as described below to the switches 36A and 36B described above and across the winding of the recording head 34 so that the frequency signals from the oscillation generator 62 are transferred to the adjacent second 1/7 of the first character area.

The switch $46^2$ is in the circuit between leads $47^1$ and $48^1$. The lead $47^1$ connects with a lead $81^1$ of leads $81^{1-5}$ to the contact 73E closed by energization of the relay 73 described above, and from there to a common lead 82 and to a switch 83A which is shown in the adding position *m* determined by the relay 83 energized in the manner described below and to a positive polarity terminal 84.

Thus an adding pulse is delivered when the contact $46^2$ is closed by the contact bridge $59^1$ and, if the relay contact 73E is closed, as shown, into lead $48^1$ and thence via a switch 85A of a five position double switch 85A, 85B, 85C, 85D and 85E which communicates with the binary stage $45^1$. The position *n* of switch 85A–E corresponds to the position in which it lies when an operating relay 85 is not energized. When the relay 85 is energized, the switch 85A–E moves to switch position 0.

The circuitry described in relation to phase II becomes successively operable in phases III–VI inclusive in dependence upon the presence or absence of perforations corresponding to input signals in the respective sensing switch $5^{1-5}$. Thus, as described, the closing of the switch $5^4$ results in phase V in the energization of a relay 86 through the several sets of switches and the closing of the switch $5^5$ results in phase VI in the energization of a relay 87 through the several sets of switches. Since the switches $5^2$ and $5^3$ remain open, relays 88 and 89 remain de-energized and therefore the contacts 88C and 89C are open, so that no frequency signals are transmitted from the oscillator 62, and the recording head 34 does not record any signals on the record element 37 in the third and fourth 1/7ths of the first character area. The fifth and sixth 1/7ths of the first character area will receive frequency signals due to the energization of the relay coils 86 and 87 to close the switches 86C and 87C.

Similarly, no addition of pulses takes place within the binary stages $45^2$ and $45^3$ since the switches 88E and 89E are in their upper position while addition of one pulse occurs in each of the binary stages $45^4$ and $45^5$ through closing of the switches 86E and 87E by the corresponding relays.

*Phase VII*

In phase VII the contact bridges $59^1$ and $59^2$ close the respective circuits through the switches $24^7$ and $46^7$. The switch $24^7$ is in the circuit between leads 91 and 92. The lead 92 is connected to a positive polarity terminal 93 to deliver within the seventh phase current through the lead 91 to a resistor 94 connected to the switch 65F in the broken-line position (transmitter) and in parallel therewith to a capacitor 95 for delayed energization of the relay 68 which operates the contact 68A, and then to ground. The capacitance and resistance of the elements 95 and 94 are chosen with reference to the relay coil 68 so that the delay is a time period longer than the time required by the motor 12 to move the shaft 19 from its position in phase VII to its position in phase I. Actually the phase I position is determined by the latch 20 engaging armature 22A. Since the delay period is longer than the time required for the shaft 19 to reach position phase I, the delay circuit becomes operative to close the switch 68A only after the shaft has been stopped in phase I position for a determined time interval to allow synchronization between the transmitter and receiver, which cannot otherwise be fully and accurately synchronized in phase I before the next cycle in which input signals in the next adjacent transverse row are sensed. The step-by-step movement of tape 1 takes place between phase VII and phase I.

The switch $46^7$ is in the circuit between leads 96 and 97. The lead 97 is connected to a positive polarity terminal 98 to energize a relay 99 and to ground. The relay 99 actuates a contact 99A, forming part of the hold circuits from the positive polarity terminal 98 to a lead 101, and depending on which of the switches 73A, 88A, 89A, 86A and 87A have been closed.

*The relay system 31*

Several of the elements and associated circuits of relay system 31 have already been fully described in connection with the distributor 21.

Figure 3:
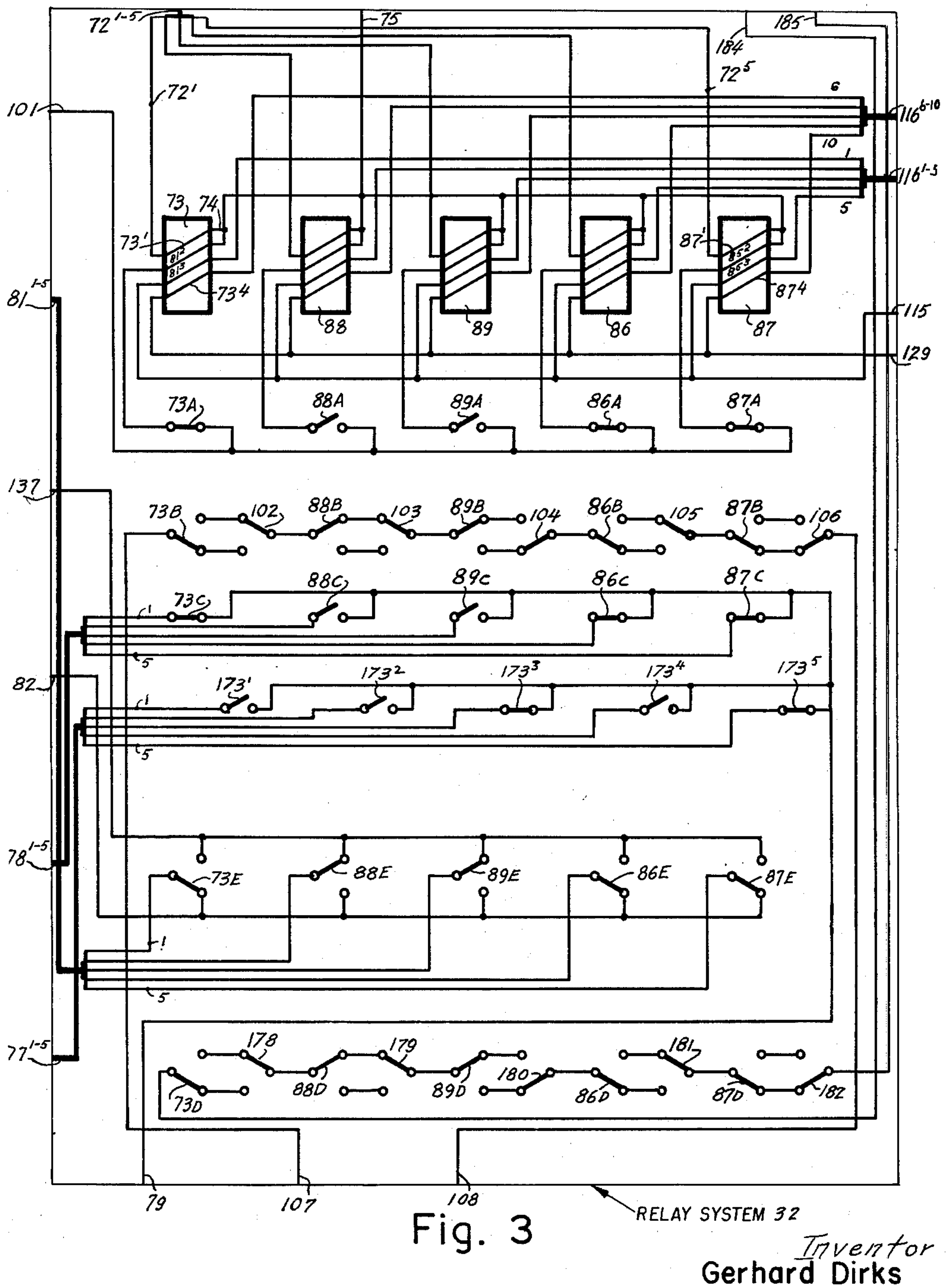
FIG. 3 is a schematic circuit diagram of an embodiment of the relay system component of the embodiment of FIG. 1.

Referring to FIG. 3 in more detail, the relay system includes a chain of pairs of switches, the left hand switches being the switches 73B, 88B, 89B, 86B, 87B already referred to and the right hand switches being switches 102 to 106 inclusive. This chain of switches is connected between leads 107 and 108. The lead 108 is from a positive polarity terminal 109 and the lead 107 goes to the winding $83^1$ of the relay coil 83 and to ground. The relay 83 also has a hold winding $83^2$ and when energized it actuates a hold contact 83B, also contact 83A to the position 1, contact 83C, contact 83D, contact 83E, contact 83F and contact 83G.

The opening and closing of the left-hand switches is determined by a combination on the tape at the end of a checking group, that is the portion of tape to be sensed between checking operations. The opening and closing of the right-hand switches is predetermined, these switches being set in accordance with the particular combination of input signals in the tape 1 determining when the checking operations are to be made. This combination in the tape may, for example, be the usual combination indicating the return of the punch or printer to the start position. The effect of this chain is that when such combination is sensed all the switches in the chain are in positions resulting in a continuous current path through the chain from the lead 108 to the lead 107.

If the said combination is such that the relay 87 is the last relay to be energized, then the complete circuit of the chain cannot be effected until the whole combination has been sensed and this allows comparing during the sixth and seventh phases of rotation of the distributor arm 58 without an additional switch in the distributor in the seventh phase.

The closing of the contact 83E is related to the movement of the input tape 1. The start of the movement of the tape in synchronism with the distributor 21 is dependent upon the first operation of the switches $55^1$ and $55^2$ as described above. A circuit is set up through a relay coil 111 to ground, said coil then actuating the contact 111A which closes a circuit from a positive polarity terminal 112 to the control magnet 8 for the stepwise movement, transverse row by transverse row, of the tape in phase VII of the rotation of the shaft 10.

The actuation of the control magnet 8 for the further steps within the checking group takes place in dependence upon the cyclic closing of the contact 68A in dependence upon the delay circuit through the relay 68 as described.

The periodic closing of the contact 68A energizes periodically the relay coil 111 and thereby actuates in the same rhythm the contact 111A so that the control magnet 8 is operated in synchronism with the control magnet 22 as long as switch 113A of relay coil 113 is closed. The closing of the contact 83E by energization of the relay coil 83 excites the winding $113^1$ of the relay 113 by means of the circuit from the positive polarity terminal 112 to ground. Thus the hold winding $113^2$ is energized by the closing of contact 113B of the relay 113, which closes when switch 113A is open and thereby prevents the delivery of further starting signals to the control magnet 8. The further movement of tape 1 by the tape feed mechanism 7 is therefore interrupted.

Since the movement of the tape 1 is interrupted, the sensing switches $5^{1-5}$ no longer transmit new signals, because their circuit to the distributor 21 is interrupted by the opening of a switch 126 upon the energization of the relay 83. In the next rotation of the distributor arm 58, instead of the relays 73, 88, 89, 86 and 87 being energized by signals sensed at the input tape, they are energized by a sensing of the binary stages $45^{1-5}$, and in subsequent rotation by a sensing of the binary stages $45^{6-10}$.

On completion of the chain of pairs of switches 73B, 88B, 89B, 86B and 87B and 102 to 106 and energization of the coil 83, the contact 83C is closed with the result that a circuit is closed from a positive polarity terminal 114 through the switch 65G then in the broken-line position (transmitter) through a switch 85F in switch position $85F^2$, to a lead 115. The switch 85F is controlled by the delay relay 85 as described below. The common lead 115 goes to the windings $73^3$, $88^3$, $89^3$, $86^3$, and $87^3$ of the relays 73, 88, 86 and 87 and from there through leads $116^{1-5}$ to the respective plates of the reading tubes $117^{1-5}$ (FIG. 6) of the binary stages $45^{1-5}$. In the example shown in the drawing, only the circuitry of the third binary stage $44^3$ is shown, all other binary stages being identical. The further circuiting from the reading tubes $117^{1-5}$ is described below in relation to the operation of the binary stages $45^{1-10}$.

Each reading tube $117^{1-5}$ is in circuit with a respective flip-flop tube $118^{1-5}$. When the flip-flop is in zero position, that is when current flows from the cathode $119^{1-5}$ to the plate $128^0$ then the potential in lead 122 of resistor 123 is more negative than that in lead 124 which is connected to ground. The cathode $119^{1-5}$ is connected through cathode resistor 125 to a negative voltage of 150 volts for descriptive purposes. Therefore the grid of the reading tube connected to the tube 118 through a grid resistor 126 is more negative than cathode 127 and the reading tube is non-conductive.

In the "1" position of the flip-flop tube 118 the current flows between the cathode 119 and the anode $121^1$, whereas there is substantially no current between the cathode 119 and the anode $121^0$, so that the leads 124 and 122 have substantially the same potential and the grid of the reading tube 117 has substantially the same or slightly less potential than the cathode 127. The tube 117 is then conductive so that the corresponding relay winding $73^{1-5}$ is energized to energize the respective relays 73, 88, 89, 86 and 87. Therefore in dependence on which of the relays is energized, certain of relay contacts 73C, 88C, 89C, 86C and 87C are closed when the reading tubes are conductive in correspondence with the "1" position of the flip-flops.

Conversely, the other ones of relay contacts 73C, 88C, 89C, 86C and 87C are opened when the reading tubes $117^{1-5}$ are non-conductive in correspondence with the "0" position of the flip-flops. The operation of the flip flops is explained below in conjunction with the operation of the binary stages $45^{1-10}$ when computing.

The signal head 34 receives within the next rotation of the distributor, signals from the oscillator 62 in combinations corresponding to the setting of the relay contacts 73C, 88C, 89C, 86C and 87C and records them as the first part of a check signal on the record element 37. During the seventh phase of the rotation just described, the hold circuits of the relays which were energized are interrupted so that all the relays are free for resetting.

The closing of the relay contact 83D during energization of the relay coil 83 sets up a circuit from a positive polarity terminal 128 through the delayed relay 85 to ground. The length of time of the delay is sufficient to permit one complete rotation of the distributor 21, so that as soon as this rotation has taken place to sense binary stages $45^{1-5}$ and record the first part of the check signal, the switch 85F is moved from position $85F^2$ to position $85F^1$, and to a lead 129. A circuit is established from the positive polarity terminal 114 through the switch 65G in the broken-line position (transmitter) through the switch 83C, through the lead 129 to energize the windings $73^4$, $88^4$, $89^4$, $86^4$ and $87^4$ to the relays 73, 88, 89, 86 and 87 and out through the leads $116^{6-10}$ to the reading tubes $117^{6-10}$ of the second set of binary stages $45^{6-10}$.

In the same way as described in relation to binary stages $45^{1-5}$, the relay contacts 73C, 88C, 89C, 86C and 87C are set in accordance with the corresponding "1" or "0" position of the flip-flop tubes $118^{6-10}$.

In the seventh phase of the rotation just described, the hold circuits of the energized relays are interrupted.

*The computer and checking devices*

The computer includes the two sets of binary stages $45^{1-5}$, and $45^{6-10}$ interconnected as above described.

The relays 73, 88, 89, 86 and 87 are set in accordance with the combination of input signals in a transverse row, and the contacts 73E, 88E, 89E, 86E and 87E, correspondingly open or closed are read successively by the distributing circuits $47^{1-5}$ of which in phase II reading of the contact 73E takes place, in phase III reading of the relay contact 88E takes place and so on, and in phase VI reading of the relay contact 87E takes place. During these successive reading stages, signals are fed to the corresponding binary stages $45^{1-5}$ in cases where a relay 73, 88, 89, 86 and 87 is energized.

The closing of the circuit effects the pulses which operate the flip-flops in the respective binary stages, these pulses being introduced from leads $131^{1-5}$ and capacitors $132^{1-5}$. Each pulse effects a change-over of the flip-flop in known manner, first from the "0" to the "1" position and then from the "1" to the "0" position. In the second change-over, from the anode $121^1$ to the anode $121^0$ the potential of the lower end 133 of resistor 134 changes from a more negative potential to almost zero potential, thereby releasing a positive pulse through a capacitor 135 and a diode 136 to the pulse input of the next succeeding binary stage.

The binary computer operates therefore in its binary stages successively, beginning from the lowest order in accordance with the sensing of the respective relay contacts 73E, 88E, 89E, 86E and 87E in the distributor phases II–VI. This allows an interval time for a carry pulse from a lower to the next higher binary stage. Each binary stage includes a conventional flip-flop circuit.

The carry-over from the binary stage $45^5$ to the binary stage $45^6$ takes place as explained above.

The resetting of all binary stages $45^{1-5}$ to the "1" position takes place by the adding of the complementary value in each stage after the respective relays 73, 88, 89, 86 and 87 have been set in the manner described above and have been held by the respective hold windings $73^2$, $88^2$, $89^2$, $86^2$ and $87^2$.

Thus, when the relay 83 was energized as previously described, the switch 83A was moved from position *m* to position 1 thus connecting a lead 137 to the positive polarity terminal 84 thereby to connect said terminal to the upper or complementary side of the relay contacts 73E, 88E, 89E, 86E and 87E. Therefore, the operation of distributor section 46 which previously when adding sensed the values indicated by the respective open and closed lower contacts, for subtraction senses the complementary values indicated by the corresponding closed and open upper contacts. It is noted that the switch arms of both the upper and lower contacts 73E, 88E, 89E, 86E and 87E have remained fixed although subtraction is now taking place.

In the next cycle, the operation of the delayed relay 85 also actuates the switches $97^{1-5}$ from position *n* to position *c* thereby to connect the leads $48^{1-5}$ of distributor section 46 to the set of binary stages $45^{6-10}$, to deliver a complementary value to each stage in the same manner as above described for stages $45^{1-5}$, and puts all the stages $45^{6-10}$ in the "1" position.

Depending upon the input signals from the tape 1 for each checking group a maximum of eighty character areas on the record elements 37 and 38 will receive signals for characters. After the recording of the last character in a checking group consisting of eighty characters, the next two character areas (eighty one and eighty two) will receive check symbols respectively from the two sets of binary stages as described. In the event that the checking group comprises fewer than the eighty characters referred to as a maximum, the record elements 37 and 38 continue to rotate stepwisely to complete the rotation after the two checking symbols have been recorded.

The remaining areas of the record elements, namely the eighty-third, eighty-fourth and eighty-fifth areas, are not used for recording characters but the time required for these three areas to pass the signal head is used for operating control signals between and in the receiving and transmitting systems. When the eighty third area passes the signal head 34, a switch 138A is closed by a projection 138 on the shaft 39, thereby closing the contacts *q*, *r* of said switch 138A, to deliver one pulse from a positive polarity terminal 139 to the last stage $45^1$ of the binary computor which effects a successive carry through all the stages $45^{1-10}$ clearing them to the zero position and delivering a carry to the relay circuit 49 (shown in FIG. 7) which thereupon energizes the relay 63, to set the switch 63A from position *s* to position *t*. This effects an interruption of the circuit from the distributor section 25 to the recording head 34.

When the eighty fifth area passes below the signal head 34, a contact 141 operated by a projection 142 on the shaft 39 connects a positive polarity terminal 143 through closed switch 144A to the coil 36 of the pulse-actuated two-position triple switch 36A, 36B, 36C and to ground. The relay coil 36 operates the switches 36A, 36B and 36C from position *a* to position *b*, with the result that the signal head 34 is now connected through the switch 36B in position *a* to the amplifier 42 to operate as a sensing head during the next rotation of the record element 37.

The amplifier 42 (FIG. 4) has an input lead 145 delivering the sensed signals from the signal head 34 through a grid capacitor 146 and a grid resistance 147 to grid 148 of a double triode 149 amplifying in the left-hand system the incoming signals effecting respective voltage alterations at anode resistor 151 which delivers the amplified signals to a capacitor 152 and a grid resistance 153 to grid 154 of the right-hand system of the double triode 149 for further amplification. The amplified signals will be operative in the primary winding 155 connected in the anode circuit of the right-hand system thus inducing the amplified signals to the secondary winding 156 of a transformer 157. The output of the winding 156 is rectified by a full wave selenium rectifier 158 so that it delivers direct current in dependence upon the amplified frequency signals to the winding $43^1$ of the telegraphic relay 43 controlling its contact 43A to and direct current signals from the positive polarity terminal 45 through the transmission line 44 to the receiver in known manner.

The telegraphic relay 43 being of a polarized type, is reset by the constantly-energized winding $43^2$.

*The receiver*

The receiver is positioned at the end of the transmission line 44 and is of identical construction to the transmitter described except that certain switches, relays, contacts and other parts are in positions shown in full lines in FIG. 1.

The incoming signals to the receiver enter through the line 44. The switch 65A is in the full line position and energization of the telegraphic relay 66 is dependent upon opening and closing of the relay contact 43A of the transmitter and to ground. Because the transmission line 44 is operated according to closed circuit standard operation the coil of the telegraphic relay 66 of the receiver is normally energized while the transmission line is inactive and the contact 43A of the telegraphic relay of the transmitter is closed.

Within the eighty third area of the first recording rotation of the recording element 37 in the transmitter, the closing of the contact 138A with its contacts *q* and *r* by the projection 138 of the shaft 39 closes the winding $43^3$ of the telegraphic relay 43 to ground for a short instant to thereby open contact $42^2$ of the transmitter in the closed circuit transmission line thereby deenergizing the relay coil of the telegraphic relay 66 of the receiver to close the switch 66A in the receiver for a short interval.

This connects the positive polarity terminal 67 through the switch 65E of the receiver in full line position to the lead 28 of distributor section 24 of the distributor 21 which is now still arrested in phase I (FIG. 2), through switch $24^1$ closed by contact bridge $59^2$ to the lead 64 through a relay coil 159 to ground.

The energization of the relay coil 159 in the receiver closes a switch 159A to start the motor of the receiver in the same manner as described in relation to the transmitter, except that the transmitter switch 51 is manually operated, and also closes switch 159B. The relay 159 is a delayed action relay.

As described, the previously recorded signal within the first one-seventh of one-eighty-fifth of the first recording area of the record element 37 of the transmitter when the signal head 34 of the transmitter has become a sensing head as above described, is used as a starting signal within the signal sequence for one character comprising a start signal (phase I), five character signals (phases II–VI) and one stop signal (phase VII). Thus, the receiving of this signal by the sensing head 34 of the transmitter through the amplifying circuit to the transmission line opens the relay contact 43A of the transmitter in the closed circuit transmission line thereby de-energizing the relay coil of the telegraphic relay 66 of the receiver to close the switch 66A in the receiver.

This connects the positive polarity terminal 67 through the switch 65E of the receiver in full line position to the lead 28 of distributor section 24 of the distributor 21 which is still arrested in phase I (FIG. 2) through switch $24^1$ closed by contact bridge $59^2$ to the lead 64, thence through the closed switch 159B to the switch 65F in full line position (receiver) through the relay coil 68 to ground.

The energization of the relay coil 68 closes its contact 68A, connecting the positive polarity terminal 56 to the control magnet 22 and ground to unlatch the armature 22A from the latch 20 to release the shaft 19 for one complete rotation thereof.

When the distributor arm 58 of the receiver has reached phase II, the sensing head 34 (transmitter) reads the signals recorded as previously described. The amplifier 42 amplifies these signals to open contact 43A of the telegraphic relay 43 (transmitter) to deenergize through the transmitting line 44 the relay 66 of the receiver to close the switch 66A (receiver). The closing of the switch 66A in phase II of rotation effects a circuit from the positive polarity terminal 67 through the switch 65E in the full line position (receiver) to the lead 28 of the distributor section 24 thence through the contact $24^2$ through the contact bridge $59^2$ to the lead $29^1$ within phase II and to the lead $72^1$ to energize the winding $73^1$ of the relay 73 operating the sensed switches or contacts 73A–E and through the lead 75 to ground.

The receiver then operates to storage device through its recording head 34 and to compute through its binary stage $45^1$ by actuation of the sensed parts including relay coils, relay systems, distributor sections, switches, etc., as previously described in conjunction with the transfer of signals from tape 1 to the record element 37 and to binary $45^{1-10}$ except that the signals come into the lead 28 under control of the switch 66A operated from the relay 66 actuated in dependence on the transmission line (receiver). Phases III–VI are but a repetition of the procedure outlined in relation to phase II.

Phase VII of the receiver corresponds likewise to the procedure described in relation to the transmitter.

While the receiver is recording the data from the transmitter record element 37, the transmitter is operative to record input signals from the next group of characters between checking operations but such recording takes place on record element 38 through the signal head 35 which is switched into circuit when signal head 34 has switched over to sensing condition and by switching over of switches 36A and 36B from position *b* to *a* and as previously explained. The recording on the recording element 38 of the transmitter from tape 1 corresponds fully to the recording described in relation to recording element 37. All the signal sequences for the maximum of eighty characters are recorded in the recording element 37 (receiver) including as last signal the particular combination signal (check-initiation signal) determining when the checking operation is to take place. During such recording, under the control of the relay contacts 73C, 88C, 89C, 86C and 87C in dependence on which of the relays 73, 88, 89, 86 and 87 are energized by signals from the transmitting line computed in the binary stages $45^{1-5}$ in dependence on the positions of the relay contacts 73E, 88E, 89E, 86E and 87E. During the recording of the signals for the group of characters to be checked the computation is effected by addition in dependence on the respective position of the switches to the lower contacts 73E, 88E, 89E, 86E and 87E because the lead 32 is operative through the switch 83A in position in and from the distributor section 25. The sensing of the special combination signal closes the circuit through the comparing circuit comprising the said chain of pairs of switches 73B, 88B, 89B, 86B and 87B and 102 to 106 from the lead 108 through the chain to the lead 107, the relay coil 82 and thence to ground, as already described.

The energization of the coil 83 actuates all its controlled switches including the switch 83A going from position *m* to *l*, from the positive polarity terminal 84 to the lead 137 and thence to the upper complementary contacts 73E, 88E, 89E, 86E and 87E of the computing circuit to subtract. It is noted that although in the transmitter the windings $73^3$, $88^3$, $89^3$, $86^3$ and $87^3$ and $73^4$, $88^4$, $89^4$, $86^4$ and $87^4$ of the relays 73, 88, 89, 86 and 87 have been energized to set the binary stages in operation in the receiver, this does not take place because the connection to the positive polarity terminal 114 is interrupted by the open switch 65G (full line position in receiver) so that the incoming signals from the sensing of the recorded check signals in the record element 37 of the transmitter set the relays 73, 88, 89, 86 and 87 of the receiver in the usual manner effecting simultaneous recording in record element 37 of the receiver and computing by complementary adding to the binary stage $45^{1-5}$ of the receiver, in the first rotation of the distributor 21 after said check initiation signal, and in stages $45^{6-10}$ in the next following rotation of said distributor as described in relation to the transmitter.

If the transmission has been correct, each of the stages $45^{1-10}$ in the receiver must show the "1" position. The contact 138A is then closed in the first phase of the eighty third rotation of the distributor delivering for a short interval a positive pulse from the positive polarity terminal 139 through the closed switch 138 *q—r* to the last binary stage $45^1$ in the receiver. This effects a carry in all the stages from $45^{1-10}$ indicating by energization or ignition of the discharge relay 49 in the receiver that the transmission was correct. The relay 49 (FIG. 7) comprises an input lead 161 receiving the carry signal from binary stage $45^{10}$. The incoming carry signal is delivered to a capacitor 162 and a grid resistor 163 to ignite through ignition grid 164*a* discharge tube 165, in the anode circuit of which the relay 63 and the switch 36C within switching positions *a* and *b* are connected to a positive polarity terminal 166. The ignition of tube 165 indicates the identity of the transmitted with the received information signals and energizes relay coil 63 in the receiver switching the switch 63A from position *s* to *t*, and the five position double switch 63B–F from position *i* to *k*. In the phase VII of the eighty third rotation of the distributor arm 58*a* projection 167 on the shaft 39 closes a then open switch 168 and a projection 169 diametrically opposed to the projection 167 opens a switch 171. The closing of the switch 168 closes the circuit from a positive polarity terminal 172 through the coil 65 through the closed switch 57C to ground to energize the relay 65 and switch all its dependent relay contacts 65A–G from receiver to transmitter (in the receiver system). During the entire eighty fourth rotation of the distributor arm 58, the receiving system temporarily is switched to transmit the signal indicating that the check was correct.

This signal is a combination signal determined by a fixed chain of contacts $173^{1-5}$ (FIG. 3) and this combination may correspond to the conventional code combination which indicates for a teleprinter "go to a new line." This combination is made operative by current from the oscillator 62 through the lead 79 through its common upper lead and in accordance with the combination to the corresponding ones of the leads $78^{1-5}$ and thence through the switch 63B–F in its position *k* to the corresponding ones of the leads $32^{1-5}$ to distributor section 25 delivering during phases II–VI signal sequences corresponding to said combinations through the switch 63A taken in position *t* to the input lead 145 of the amplifier 42 energizing accordingly the telegraphic relay 43 to accordingly open and close the switch 43A and deliver this combination signal indicating the correct reception of the information signals as the receiver now operating in transmitting condition to the transmitter now operating in receiving condition.

The oscillator 62 is of standard design and may comprise, for example, a multivibrator switching circuit with a flip-flop tube 174 operative in oscillating condition from an anode $175^1$ to an anode $175^2$ and reverse operating at a frequency of about 1000 cycles per second although this is not critical for a record element of about 6 inches in diameter at a standard transmission speed of about 7 characters per second. The multivibrator switching circuit has an output through a capacitor 176 to the lead 79.

Within the seventh phase of the eighty third rotation the projection 167 closes within the receiver closed contact 168 to switch the receiver to the transmitting condition during the eighty fourth rotation. The contact 171 of the transmitter opens in dependence on the projection 169 on the shaft 39 (transmitter) to deenergize the relay 65 which is in circuit from a positive polarity terminal 177 through the switch 57C in bottom line position (transmitter) through the relay coil 65 of the transmitter and the switch 171 to ground. The deenergization of the relay 65 operates all its dependent relay contacts 65A–H as already described into their receiving condition. During the eighty fourth rotation of the distributor arm 58 the transmitter is therefore prepared to receive the combination signals from the receiver indicating correct reception of the information signals which is transmitted as described above.

The combination signals from the receiver come in on the transmission line 44 of the transmitter which is then in its receiving condition and energizes the relay 66 in dependence on said incoming signal combination. The energization and de-energization of the relay 66 actuates accordingly the relay contact 66A connecting or disconnecting the positive polarity terminal 67 through the switch 65E which is then now in full line position (receiving condition of the transmitter) to lead 28 and thence through the distributing section 24, leads $29^{1-5}$ in the usual way to the relay windings $73^1$, $88^1$, $89^1$, $86^1$ and $87^1$ of the relays 73, 88, 89, 86 and 87. Another chain of pairs of switches comparable in structure to, but different in combination from, the chains 73B, 88B, 89B, 86B and 87B and 102 to 106 is provided between the contacts 73D, 88D, 89D, 86D and 87D from fixed contacts 178 to 182 identical to combinations selected by $173^{1-5}$ in both the transmitter and the receiver. The contacts $173^{1-5}$ are used within the receiver when in transmitting condition to deliver the combination signal indicating the correct reception of the transmitted information from the receiver to the transmitter (go forward signal), when comparing chain 73D, 88D, 89D, 86D and 87D and 178 to 182 is used in the transmitter when in receiving condition to recognize said combination from among the incoming signals in the eighty fourth rotation of both receiver and transmitter.

The relays 73, 88, 89, 86 and 87 having been set, the chain 73D, 88D, 89D, 86D and 87D, 178 to 182 is in circuit between a positive polarity terminal 183 at a lead 184 and a lead 185 thus connecting upon identity of the incoming signal combination the positive polarity terminal 183 through to the closed switch 83F closed theretofore by the relay 83 in the manner described to the relay 36 and winding thence to ground. Energization of the relay 36 in the transmitter (receiving condition) actuates the switches 36A to 36C from position *a* back to position *b* so that the signal head 34 again becomes a recording head and so that the subsequent combinations of signals between checking operations on the tape 1 can be recorded on the record element 37 while signals from the record element 38 are then sensed by the signal head 35 and transmitted through the amplifier 42, the telegraphic relay 43, the contact 43A to the transmission line 44 and thence to the receiver. In the first phase of the eighty fifth rotation, both receiver and transmitter are returned to respective normal receiving and transmitting condition because the switches 171 and 168 in each are disengaged from the projections 167 and 169 in each device and are returned to their normal switching positions in which the switch 171 is closed and the switch 168 is open.

After both transmitter and receiver have returned to their normal condition in the phase I of the eighty fifth rotation, the projection 142 on the shaft 39 closes contact 141 for a short interval. During this interval, a circuit is operative only in the receiver through the closed switch 63G under the control of relay 63 if said relay 63 has been energized by the discharge relay 49 if the carry signal from the binary stage $45^{10}$ was effective through the closed switch 65H in the receiver (full line position) to indicate that the reception of the transmitted signals to the receiver had been correct. Therefore, the relay 36 of the receiver is operated to switch over in the receiver its respective switches 36A, 36B and 36C from position *b* to position *a*, thus changing the signal head 34 from recording to switching position on the record element 37 and the signal head 35 from receiving to recording position on the record element 38 only if the transfer of information signals to the receiver was correct. Therefore, upon the following rotation of the record element 37 within the receiver the correctly transmitted information signals are delivered from now the sensing head 34 through the amplifier 42 to effect punching of the receiver tape through the punching device 17 in the receiver in the manner described below. The switch 144A in the transmitter was only closed during the first rotation of the record element 37 as described and is open during all the following rotation of the record elements 37 and 38 of the transmitter. During the eighty fifth rotation of the distributor arm 58 and the first rotation of the record element 37 the closing of the contact 141 as described closes the circuit through the then closed switch 144A to the relay 36 and ground and additionally the circuit from a positive polarity terminal 186 through the winding $144^1$ of the delayed action relay 144 to ground. The energization of the relay 144 actuates a switch 144B in a delayed manner to close a circuit from the positive polarity terminal 186 through the hold winding $144^2$ to ground and to open the switch 144A which has already been operative as described in circuit from the positive polarity terminal 143 through the switch 141 to the relay 36 and ground. Within the next rotation of the record elements 37 and 38 the actuation of the relay coil 36 is dependent upon the preceding reception of the "go forward signal" delivered as described above from the receiver during the eighty fifth rotation of the distributor arm 58 and is operative in the transmitter then in receiving condition in the described manner through the circuit from the positive polarity terminal 183 to the lead 184 through the comparing chain circuit to the lead 185 and thence through the then closed switch 83F to the relay 36 and ground. Thus, in the transmitter the switching over of the signal head 34 from sensing condition to recording condition occurs only if the transmitter has been informed that the information reached the receiver correctly.

If after the completion of the sensing rotation of the record element 37 of the transmitter at the second rotation of said record element such signal has not arrived within the eighty fourth rotation of the distributor arm 58 within the second rotation of the said record element, the circuit between the leads 184 and 185 remains open within the comparing chain and the relay 36 is not energized and the signal head 34 also remains during the third rotation of the said record element in receiving condition to retransmit the signals recorded in the said record element during its first rotation to the receiver as described above.

If, on the other hand, the discharge relay 49 in the receiver has not been ignited this indicates that the transmission was incorrect and the relay 63 remains deenergized and the switch 63G remains open so that no switching over from sensing to recording condition, or vice versa, of the signal heads 34, 35 takes place because the coil 36 remains deenergized when the contact 141 is closed. In the following third rotation of the record element 37 the transmission and reception of the signals in said recording element of the transmitter is repeated and the signals resulting from this sensing are transmitted again through the transmitter line 44 to the record element 37 of the receiver through the record head 34. It is noted that simultaneously with any rerecording process, erasing of earlier recorded signals on the record elements 37 and 38 is automatic and by D.C. erasing in circuit from a positive polarity terminal 187 through switch 63H to an erasing head 188 and to ground when in contact position *u* and to an erasing head 189 when in contact position *v* and to ground if the relay coil 63 is energized.

*Punching*

Now referring again to the second rotation of the record element 37 of the receiver after it has received recording signals in the first rotation from the record element 37 of the transmitter which is then in the second rotation, the sensed signals from the signal head 34 are transferred through the switch 36B in position *a* to the lead 145 and amplified and rectified in the amplifier 42 as described with respect to FIG. 4. The amplifier 42 of the receiver operates, as described above in relation to the transmitter, the telegraphic relay 43 of the receiver in dependence on signals sensed by the record head 34 from the record element 37 of the receiver. When energized, the relay winding 43 actuates the open relay contact 43A to simultaneously close the relay contact 43 and vice versa. The contact 43B is in a circuit from the positive polarity terminal 45 through the switches 65B and 65C in full line position in the receiver, to the lead 26 and thence to distributor section 23 to the leads $27^{1-5}$ each of which is connected to the corresponding punch control coil $191^{1-5}$ through the switch 65D (full line position in the receiver) through a switch 192A to ground. The switch 192A is operated by a relay 192 and is closed when the relay 192 is energized. The relay 192 is energized by contact 635 which is closed upon energization of the relay 63 as above described. The energization of the relay 192 effects the closing of a hold contact 193 which is in circuit through a switch 194 to the positive polarity terminal 112 and to ground. Therefore, the punching operation in the punching device 17 and the transfer of the receiver tape 1 by the tape feed mechanism 7, which is released by the control magnet 8, is operated by the relay 192 in dependence on the relay 63 and therefore in dependence upon the prior checking procedure that the information received was correct. The control magnets $191^{1-5}$ for the punching operation are dependent upon the actuation of the relay contact 43B within the phases II–VI of the distributor arm 58 in the receiver. Dependent within each phase upon which lead is in the circuit, the corresponding control magnet $191^{1-5}$ is energized and each transverse row of the tape 1 is punched by its corresponding control magnet $191^{1-5}$ operating the punching device to perforate said tape in a well known manner. The movement and stopping of the tape 1 takes place in the same manner as described, so that punching takes place in successive transverse rows but only if the check has indicated correct reception of received information in the receiver.

Although a single embodiment of the invention has been described in relation to perforated tapes to operate punches for punch card systems, it is to be understood that this invention is equally applicable for other uses, such as, for example, teletyping, and record means other than punch tapes, such as magnetic tapes, drums, discs or the like, may be substituted for the perforated tape. Also the electromechanical devices used, such as electromechanical relays, electromechanical distributors, electromechanical sensing contacts and punch control magnets, may be replaced by corresponding fully equivalent electronic means allowing higher speed of operation, such as, for example, flip-flops, discharge tubes or other electronic relays in the case of relays; such as electronic-magnetic chains, Dekatrons, cathode rays, operating gates or electronic distributors other than electromechanical distributers, such as light-sensitive electric means or signal heads for the electromechanical sensing contacts, such as recording heads or optic registration means for the control magnets of the punching mechanism.

As a further safeguard against error there may be a second check of the signal sequences as received by the final receiver from the storage at the receiving end, and means may then be provided for effecting an automatic repetition of the transmission from such storage to the final receiver in the event of an unfavorable check at such receiver.

Furthermore, or alternatively, there may be a check in the transmission between the original transmitter and its associated storage (when provided) with means for effecting an automatic repetition from the transmitter to that storage in the event of an unfavorable check.

The signal sequences transmitted may represent numbers or other quantitative symbols or may represent words, and the check and repetition may be effected at regular time intervals or at regular spatial positions, such as, for example at the end of a binary word of so many digits length or at the end of each line or at the end of a given number of lines, or otherwise.

Preferably, the storage means used is of a kind wherein the signal sequences are stored erasibly, for example, by a change in the magnetic or electric state of the record material of a storage element, by means of which signals may be recorded, sensed and erased with great ease. A convenient arrangement is the magnetic drum set forth in my copending patent Application Serial No. 498,047, filed March 31, 1955.

In other instances, the signal sequences may be stored by the displacement of mechanical parts and may be erased by the return of such parts to a neutral position. Such an arrangement could employ a series of pivoted levers having a stable equilibrium in two positions, whereby in one position they represent a signal stored and in the other position they indicate that no signal is stored.

For the repetition of the transmission, either the same sensing means may sense the original record a second time or there may be a second sensing means placed ahead of that which effected the first transmission, so that a second transmission may be effected without reversal of direction of the record means between the two transmissions. In such event, the original record may be an interrupted record, so that the first sensing means will be unresponsive while the second sensing means is effective, or there may be a continuous record and the first sensing means may be effecting a first sensing of a later record (if necessary for transmission to a separate checking storage) while the second sensing means is effecting a repeated sensing of an earlier record for transmission to a checking storage.

The transmission of the signals may be effected from a selective storage, for example according to any of my copending patent applications, Serial Nos. 498,047, 498,-048 and 498,049 all filed March 31, 1955, or may be initiated at a keyboard or other mechanical input means or may be initiated from a tape, or record card (such as a punched card), sheet or other record material.

The transmission line includes land line, radio transmission and other transmission means for signal sequences. Where land lines are used for the transmission, the control signal may be passed back to the transmitter along the same line as is used for the transmission or a second line may be used.

Various means may be employed for checking the transmitted signals. The check may, for example, be effected by comparison with a duplicate transmission which may be either a repeated transmission or a transmission from a storage. Moreover, the checking of the signal sequences may be effected by computation, as by subtraction to zero in the case of quantitative signals, either from the same figures or with the use of other figures, for example with debit and credit amounts, old balances and so on. Again, the checking of signal sequences may be effected by the use of check symbols. These check symbols for numbers or numbers and other characters may be built up from prime numbers.

*Switching-off the motors in the transmitter and in the receiver*

When the switch 51 (transmitter) is opened manually, the circuit from the positive polarity terminal 52 through the relay 15 is opened. While the eighty fifth record area of the record elements 37 and 38 passes below their respective signal heads, a switch 195A with its contacts *g*, *h* is opened by a projection 195 on the shaft 39 and the circuit from the positive polarity terminal 52 through the switch 195A and the hold circuit through the winding $15^2$ of the relay 15 through switch 54 is opened thereby opening the switch 15A and so that the motor 12 is deenergized.

To deenergize the relay 113, the hold circuit through the relay 83 is interrupted by a switch 196A with its contacts *x*, *y* which are opened by a projection 196 on the shaft 39 during the passage of the eighty fifth area of the record elements 37 and 38 below their respective signal heads.

In the receiver circuit, the delay relay 159 has been energized within phase I together with the incoming start pulse for each rotation of the distributor 21 so that the absence of incoming pulses for longer than one rotation will deenergize the relay 159 to open the contact 159A (used in the receiver as a hold contact) to effect the same operations as described above in relation to the transmitter to switch off the motor.

The input signals and output signals may be used in or between computers, teleprinters, printing and composing machinery, tele-control of machinery and the like.

Although the embodiment of the invention has been described with five code channels, it is still within the scope of the invention to use more or less than five code channels in the combinations or to use other types of code, for example, decimals and the like.

It is noted that where it was impossible to describe switches and their contacts one below the other the contacts have been identified elsewhere but always in the same figure by repeating the alphabetical reference to the contact, for example, *c*, *d*.

A switch 63K is dependent upon the relay 63 so that a favorable or identity check signal energizing the relay 63 in the described manner interrupts for a short interval the hold circuit of the winding $113^2$ of the relay 113 to again close the relay contact 113A and allow a further movement of the tape 1 in the described manner.

The extinguishing of the discharge tube 49 is effected by interrupting the circuit from the positive polarity terminal 166 upon the movement of the switch 36C from contact position *a* to position *b* in dependence upon the energization of the relay coil 36 as described.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalance of the following claims.

What is claimed and desired to be secured by Letters Patent is:

1. A transmission system between a transmitter station and a receiver station comprising, in combination, record carrier means in said transmitter station and having recorded thereon a plurality of sequences of individual character-representing code combination records, transmitter converting means in said transmitter station and positioned in operative proximity to said record carrier means for converting a first and consequent sequences of the character-representing records recorded on the said record carrier means into corresponding pulse sequences respectively representing said individual code combination records; transmitter storage means in said transmitter station connected to said transmitter converting means and adapted to have erasably recorded thereon recordings of a plurality of said individual character-representing pulse sequences for storing the said pulse sequences; transmitting means connected to said transmitter converting means for transmitting said pulse sequences from said transmitter station to said receiver station; receiver storage means in said receiver station adapted to have erasably recorded thereon recordings of a plurality of said individual character-representing pulse sequences for storing the said pulse sequences; first computing means for producing a first check signal at said transmitter station and for producing another first check signal at said receiver station; comparing means for causing comparing of said first check signals for identity and non-identity between the said first check signals and for causing repeating of said pulse sequences stored in said transmitter storage means when said comparing means indicates non-identity; transmitting means for transmitting said repeated pulse sequences to said receiver station; second computing means for producing a second check signal at said transmitter station and for producing another second check signal at said receiver station; recomparing means for causing recomparing of said second check signals for identity and non-identity between the said second check signals; and receiver converting means in said receiver station and positioned in operative proximity to said receiver storage means for converting pulse sequences stored in said receiver storage means into output signals, said transmitter converting means, transmitter storage means and transmitting means substantially simultaneously converting the next sequence of the character-representing records recorded on said record carrier means into further pulse sequences, storing said last-mentioned character-representing records in said transmitter station, and transmitting the said last-mentioned character-representing records to said receiver station for storage in said receiver storage means when said recomparing means indicates identity.

2. A transmission system between a transmitter station and a receiver station comprising, in combination, record carrier means in said transmitter station and having recorded thereon a plurality of sequences of individual character-representing code combination records; transmitter converting means in said transmitter station and positioned in operative proximity to said record carrier means for converting a first and consecutive sequences of the character-representing records recorded on the said record carrier means into corresponding pulse sequences respectively representing said individual code combination records; transmitter storage means in said transmitter station connected to said transmitter converting means and adapted to have erasably recorded thereon recordings of a plurality of individual character-represensing pulse sequences for storing the said pulse sequences; transmitting means connected to said transmitter converting means for transmitting said pulse sequences from said transmitter storage means to said receiver station; receiver storage means in said receiver station adapted to have erasably recorded thereon recordings of a plurality of said individual character-representing pulse sequences for storing the said pulse sequences; first computing means for producing a first check signal at said tranmitter station and for producing another first check signal at said receiver station; comparing means for causing comparing of said first check signals for identity and non-identity between the said first check signals and for causing repeating of said pulse sequences stored in said transmitter storage means when said comparing means indicates non-identity; transmitting means for transmitting said repeated pulse sequences to said receiver station for storage therein; second computing means for producing a second check signal at said transmitting station and for producing another second check signal at said receiver station; recomparing means for causing recomparing of said second check signals for identity and non-identity between said second check signals; and receiver converting means in said receiver station and positioned in operative proximity to said receiver storage means for converting said repeated received pulse sequences stored in said receiver storage means into output signals when said comparing indicates identity.

3. A transmission system between a transmitter station and a receiver station comprising, in combination, record carrier means in said transmitter station and having recorded thereon a plurality of sequences of individual character-representing code combination records; transmitter converting means in said transmitter station and positioned in operative proximity to said record carrier means for converting a first and consecutive sequences of the character-representing records recorded on the said record carrier means into corresponding pulse sequences respectively representing said individual code combination records; transmitter storage means in said transmitter station connected to said transmitter converting means and adapted to have erasably recorded thereon recordings of a plurality of said individual character-representing pulse sequences for storing the said pulse sequences; transmitting means connected to said transmitter converting means for transmitting said pulse sequences from said transmitter storage means to said receiver station; receiver storage means in said receiver station adapted to have erasably recorded thereon recordings of a plurality of said individual character-representing pulse sequences for storing the said pulse sequences; computing means for producing a check signal from said transmitter storage means of said transmitter station and for producing another check signal from said receiver storage means; comparing means for causing comparing of said check signals for identity and non-identity between said check signals; and receiver converting means in said receiver station and positioned in operative proximity to said receiver storage means for converting pulse sequences stored in said receiver storage means into output signals, said transmitter converting means converting the next sequence of said character-representing records recorded on said record carrier means into further pulse sequences when said comparing indicates identity.

4. A signal transmission system including a transmitter station and a receiver station comprising, in combination, record carrier means in said transmitter station and having recorded thereon a plurality of sequences of individual character-representing code combination records; transmitter sensing means in said transmitter station and positioned in operative proximity to said record carrier means for sensing said combination records; transmitter storage means connected to said transmitter sensing means for storing signals representing said sensed combination records representing signals and a check signal; transmitting means connected to said transmitter sensing means for transmitting said stored signals and check signal from said transmitter station to said receiver station; receiver storage means in said receiver station for receiving and storing transmitted record and check signals; receiver sensing means in said receiver station and positioned in operative proximity to said receiver storage means for sensing received signals stored in said receiver storage means; comparing means for comparing said received check signal stored in said receiver storage means with said check signal stored in said transmitter storage means to check said received signals for identity and non-identity with said record signals; and control means responsive to an identity for effecting a further cycle of sensing, transmitting, storing and checking and responsive to a non-identity for sending a repeat signal to said transmitter station to cause repeating of the transmission of said previously stored record signals.

5. A signal transmission system including a transmitter station and a receiver station comprising in combination, record carrier means having recorded thereon consecutive groups of record signals; transmitter sensing means in said transmitter station and positioned in operative proximity to said record carrier means for sensing said record signals; first computing means for computing a first check for a number of said record signals and producing a first check signal corresponding to said first check; transmitter storage means connected to said transmitter sensing means and to said first computing means for storing record signals sensed by said transmitter sensing means and said first check signal; transmitting means connected to said transmitter sensing means for transmitting said record signals sensed by said transmitter sensing means and said first check signal from said transmitter station to said receiver station; receiver storage means in said receiver station for receiving and re-storing transmitted record and check signals; receiver sensing means in said receiver station and positioned in operative proximity to said receiver storage means for sensing received signals and check signals re-stored in said receiver storage means; second computing means for computing a second check for the received record signals for which said first check was computed and producing a second check signal corresponding to said second check; comparing means for comparing said second check with said first check to ascertain the identity or non-identity between said checks; and control means responsive to an identity for effecting a further cycle of sensing, computing, storing and transmitting, and responsive to a non-identity for sending a repeat signal to said transmitter station to cause the repeating of the cycle of sensing, computing, storing and transmission of said stored record and check signals.

6. A signal transmission system including a transmitter station and a receiver station comprising, in combination, record carrier means having recorded thereon consecutive groups of record signals; transmitter sensing means in said transmitter station and positioned in operative proximity to said record carrier means for sensing said record signals; transmitter storage means connected to said transmitter sensing means for storing record signals sensed by the said transmitter sensing means; transmitting means connected to said transmitter sensing means for transmitting said record signals sensed by said transmitter sensing means from said transmitter station to said receiver station; receiver storage means in said receiver station for receiving and storing transmitted signals; receiver sensing means in said receiver station and positioned in operative proximity to said receiver storage means for sensing received signals stored in the said receiver storage means; comparing means for comparing received signals stored in said receiver storage means with said record signals to check said received signals for identity and non-identity with the said record signals; and control means responsive to an identity for forwarding the received signals stored in said receiver storage means, and responsive to a non-identity for sending a repeat signal to said transmitter station to cause the repeat sensing of said record signals stored in said transmitter storage means.

References Cited in the file of this patent

UNITED STATES PATENTS

| | | |
|---|---|---|
| 1,972,326 | Angel | Sept. 4, 1934 |
| 2,242,196 | Thompson et al. | May 13, 1941 |
| 2,689,950 | Bayliss et al. | Sept. 21, 1954 |
| 2,700,755 | Burkhart | Jan. 25, 1955 |
| 2,702,380 | Brustman et al. | Feb. 15, 1955 |
| 2,706,215 | Van Duuren | Apr. 12, 1955 |